(12) United States Patent
Jones et al.

(10) Patent No.: US 7,962,466 B2
(45) Date of Patent: Jun. 14, 2011

(54) AUTOMATED TOOL FOR HUMAN ASSISTED MINING AND CAPTURING OF PRECISE RESULTS

(75) Inventors: Scott A. Jones, Carmel, IN (US); Thomas E. Cooper, Carmel, IN (US)

(73) Assignee: ChaCha Search, Inc, Carmel, IN (US)

( * ) Notice: Subject to any disclaimer, the term of this patent is extended or adjusted under 35 U.S.C. 154(b) by 514 days.

(21) Appl. No.: 11/647,286

(22) Filed: Dec. 29, 2006

(65) Prior Publication Data

US 2007/0185843 A1    Aug. 9, 2007

Related U.S. Application Data

(63) Continuation-in-part of application No. 11/336,928, filed on Jan. 23, 2006.

(60) Provisional application No. 60/807,428, filed on Jul. 14, 2006.

(51) Int. Cl.
*G06F 7/00* (2006.01)
*G06F 17/30* (2006.01)

(52) U.S. Cl. .................. 707/706; 707/769

(58) Field of Classification Search .......... None
See application file for complete search history.

(56) References Cited

U.S. PATENT DOCUMENTS

| | | | |
|---|---|---|---|
| 5,559,940 A | 9/1996 | Hutson | |
| 5,724,571 A * | 3/1998 | Woods | 1/1 |
| 5,732,259 A | 3/1998 | Konno | |
| 5,757,644 A | 5/1998 | Jorgensen et al. | |
| 5,809,250 A | 9/1998 | Kisor | |
| 5,845,278 A | 12/1998 | Kirsch | |
| 5,875,231 A | 2/1999 | Farfan et al. | |
| 5,915,010 A | 6/1999 | McCalmont | |
| 5,918,010 A | 6/1999 | Appleman et al. | |
| 5,982,370 A | 11/1999 | Kamper | |
| 6,081,788 A | 6/2000 | Appleman et al. | |
| 6,157,926 A | 12/2000 | Appleman et al. | |
| 6,195,681 B1 | 2/2001 | Appleman et al. | |
| 6,212,517 B1 | 4/2001 | Sato | |
| 6,226,648 B1 | 5/2001 | Appleman et al. | |
| 6,269,355 B1 | 7/2001 | Grimse et al. | |
| 6,330,576 B1 | 12/2001 | Mochizuki et al. | |

(Continued)

FOREIGN PATENT DOCUMENTS

EP    1209583 A2 *    5/2002

(Continued)

OTHER PUBLICATIONS iNetNow, "iNetNow Announces the First Human-Powered Internet Search Engine: New Company Allows Access to Experienced, Web Surfers via Phone 24 Hours a Day, 7 Days a Week," Business Wire, 2000.*

(Continued)

*Primary Examiner* — Pierre M Vital
*Assistant Examiner* — Rachel J Lee
(74) *Attorney, Agent, or Firm* — Staas & Halsey

(57) ABSTRACT

An automated tool for human assisted analysis of search results for obtaining precise results responsive to a request. A single query entry triggers a search using one or more resources and results returned from the resources are displayed in a corresponding embedded renderer. A human provider analyzes the returned results and extracts pertinent information for delivery to a requestor who submitted the query.

15 Claims, 12 Drawing Sheets

U.S. PATENT DOCUMENTS

| | | | |
|---|---|---|---|
| 6,336,132 B2 | 1/2002 | Appleman et al. | |
| 6,346,952 B1 | 2/2002 | Shtivelman | |
| 6,370,527 B1 | 4/2002 | Singhal | |
| 6,377,944 B1 | 4/2002 | Busey | |
| 6,430,558 B1 | 8/2002 | Delano | |
| 6,434,549 B1 | 8/2002 | Linesky | |
| 6,434,556 B1 | 8/2002 | Levin et al. | |
| 6,484,162 B1 | 11/2002 | Edlund et al. | |
| 6,507,841 B2 | 1/2003 | Riverieulx de Varax | |
| 6,549,889 B2 | 4/2003 | Lauffer | |
| 6,567,103 B1 | 5/2003 | Chaudhry | |
| 6,578,010 B1 | 6/2003 | Teacherson | |
| 6,578,022 B1 | 6/2003 | Foulger et al. | |
| 6,584,471 B1 | 6/2003 | Maclin | |
| 6,621,505 B1 | 9/2003 | Beauchamp et al. | |
| 6,643,641 B1 | 11/2003 | Snyder | |
| 6,675,159 B1 | 1/2004 | Lin et al. | |
| 6,735,632 B1 | 5/2004 | Kiraly et al. | |
| 6,742,178 B1 | 5/2004 | Berry et al. | |
| 6,788,316 B1 | 9/2004 | Ma et al. | |
| 6,829,585 B1 | 12/2004 | Grewal | |
| 6,845,369 B1 | 1/2005 | Rodenburg | |
| 6,859,909 B1 | 2/2005 | Lerner et al. | |
| 6,873,982 B1 | 3/2005 | Bates et al. | |
| 6,895,406 B2 | 5/2005 | Fables et al. | |
| 6,901,394 B2 | 5/2005 | Chauhan et al. | |
| 6,924,827 B1 | 8/2005 | Gulati et al. | |
| 6,947,924 B2 | 9/2005 | Bates et al. | |
| 6,990,494 B2 | 1/2006 | Bates et al. | |
| 7,000,008 B2 | 2/2006 | Bautista-Lloyd et al. | |
| 7,047,279 B1 | 5/2006 | Beams et al. | |
| 7,054,848 B1 | 5/2006 | Lannert et al. | |
| 7,287,021 B2 | 10/2007 | De Smet | |
| 7,822,765 B2 * | 10/2010 | Back et al. | 707/769 |
| 2001/0009013 A1 | 7/2001 | Appleman et al. | |
| 2002/0059395 A1 | 5/2002 | Liou | |
| 2002/0062343 A1 | 5/2002 | Appleman et al. | |
| 2002/0083031 A1 | 6/2002 | De Varax | |
| 2002/0091836 A1 | 7/2002 | Moetteli | |
| 2002/0099700 A1 | 7/2002 | Li | |
| 2002/0107709 A1 | 8/2002 | Colson et al. | |
| 2002/0140715 A1 | 10/2002 | Smet | |
| 2002/0147848 A1 | 10/2002 | Burgin et al. | |
| 2002/0167539 A1 | 11/2002 | Brown et al. | |
| 2003/0002445 A1 | 1/2003 | Fullana | |
| 2003/0018626 A1 | 1/2003 | Kay et al. | |
| 2003/0061201 A1 | 3/2003 | Grefenstette et al. | |
| 2003/0084040 A1 | 5/2003 | Jeffrey | |
| 2003/0126136 A1 | 7/2003 | Omoigui | |
| 2003/0140037 A1 | 7/2003 | Deh-Lee | |
| 2003/0144994 A1 | 7/2003 | Wen et al. | |
| 2003/0145001 A1 | 7/2003 | Craig et al. | |
| 2003/0163454 A1 | 8/2003 | Jacobsen et al. | |
| 2003/0174818 A1 | 9/2003 | Hazenfield | |
| 2003/0198325 A1 | 10/2003 | Bayne | |
| 2003/0208535 A1 | 11/2003 | Appleman et al. | |
| 2003/0217059 A1 | 11/2003 | Allen et al. | |
| 2003/0227479 A1 | 12/2003 | Mizrahi | |
| 2004/0010484 A1 | 1/2004 | Foulger et al. | |
| 2004/0023644 A1 | 2/2004 | Montemer | |
| 2004/0024752 A1 | 2/2004 | Manber et al. | |
| 2004/0049541 A1 | 3/2004 | Swahn | |
| 2004/0111671 A1 | 6/2004 | Lu et al. | |
| 2004/0177088 A1 | 9/2004 | Jeffrey | |
| 2004/0186738 A1 | 9/2004 | Reisman | |
| 2004/0203634 A1 | 10/2004 | Wang et al. | |
| 2005/0010559 A1 | 1/2005 | Du et al. | |
| 2005/0026129 A1 | 2/2005 | Rogers | |
| 2005/0071741 A1 | 3/2005 | Acharya et al. | |
| 2005/0086290 A1 | 4/2005 | Joyce et al. | |
| 2005/0105712 A1 | 5/2005 | Williams et al. | |
| 2005/0114789 A1 | 5/2005 | Chang et al. | |
| 2005/0131866 A1 | 6/2005 | Badros | |
| 2005/0136949 A1 | 6/2005 | Barnes, Jr. | |
| 2005/0154723 A1 | 7/2005 | Liang | |
| 2005/0165766 A1 | 7/2005 | Szabo | |
| 2005/0187895 A1 | 8/2005 | Paya et al. | |
| 2005/0198021 A1 | 9/2005 | Wilcox et al. | |
| 2005/0198116 A1 | 9/2005 | Appleman et al. | |
| 2005/0210042 A1 | 9/2005 | Goedken | |
| 2005/0278633 A1 | 12/2005 | Kemp | |
| 2005/0289124 A1 | 12/2005 | Kaiser et al. | |
| 2006/0010105 A1 | 1/2006 | Sarukkai et al. | |
| 2006/0026152 A1 | 2/2006 | Zeng et al. | |
| 2006/0053224 A1 | 3/2006 | Subramaniam | |
| 2006/0070012 A1 | 3/2006 | Milener et al. | |
| 2006/0074984 A1 | 4/2006 | Milener et al. | |
| 2006/0085529 A1 | 4/2006 | Ziegler et al. | |
| 2006/0129536 A1 | 6/2006 | Foulger et al. | |
| 2006/0155694 A1 * | 7/2006 | Chowdhury et al. | 707/4 |
| 2006/0288087 A1 | 12/2006 | Sun | |
| 2007/0005344 A1 | 1/2007 | Sandor et al. | |
| 2007/0005698 A1 | 1/2007 | Kumar et al. | |
| 2007/0014537 A1 | 1/2007 | Wesemann et al. | |
| 2007/0038601 A1 | 2/2007 | Guha | |
| 2007/0143262 A1 | 6/2007 | Kasperski | |
| 2007/0260601 A1 | 11/2007 | Thompson | |
| 2010/0138402 A1 * | 6/2010 | Burroughs et al. | 707/706 |

FOREIGN PATENT DOCUMENTS

| | | |
|---|---|---|
| EP | 1341099 | 3/2009 |
| WO | WO 01/86928 | 11/2001 |
| WO | WO 2004/057473 | 7/2004 |
| WO | 2007/052285 | 5/2007 |

OTHER PUBLICATIONS

Yuwono et al., "A World Wide Web Resource Discovery System," The Hong Kong University of Science and Technology Library, 1995.*

Howe et al., "SAVVYSEARCH: A Metasearch Engine that Learns Which Search Engines to Query," American Association for Artificial Intelligence, 1997.*

Jamtgaard et al., "Bringing the Wireless Internet to Mobile Devices," IEEE, 2001.*

Pizzato et al., "Extracting Exact Answers using a Meta Question Answering System," Proceedings of the Australasian Language Technology Workshop 2005, pp. 105-112, Dec. 2005.*

"Library Question—Answer—Question #1205187", Santa Monica Public Library's Question Point, Dec. 2005.

Walter S. Mossberg et al., "What You Should Know About Web Searches—A Guide to Search-Engine Features", Wall Street Journal, Dec. 2005, p. D1.

"Connotate—Beyond Search", Connotate Technologies, http://www.connotate.com/beyond_search/beyond_search.asp, printed Feb. 21, 2006.

Wired Magazine, "Serf Engine", http://www.wired.com/wired/archive/8.07/mustread.html?pg=13, printed Jan. 26, 2006.

"SmartDraw Viewer", http://www.smartdraw.com/product/viewer.htm, printed Mar. 21, 2006.

"Leave the Surfing to the Pros, Please", The Travel Technologist, Mar. 2, 2000, http://www.elliott.org/technolooy/2000/inetnow.htm, printed Jan. 26, 2006.

"INetNow.com", Breakthrough Technologies, http://www.breakthrough-tech.com/projects/inetnow/, printed Jan. 26, 2006.

Bob Tedeschi, "Google's Shadow Payroll Is Not Such a Secret Anymore", The New York Times, E-Commerce Report, Jan. 16, 2006.

"Gravee Search", http://www.gravee.com, printed Mar. 21, 2006.

"Just Answer", http://www.justanswer.com/forum_topics.asp, printed Mar. 21, 2006.

"Ask Now", http://www.asknow.org/chat/chat.cfm, printed Dec. 13, 2005.

U.S. Appl. No. 11/336,928, filed Jan. 23, 2006, Scott A. Jones, Chacha Search, Inc.

U.S. Appl. No. 11/777,505, filed Jul. 13, 2006, Scott A. Jones, et al., Chacha Search, Inc.

U.S. Appl. No. 11/779,502, filed Jul. 18, 2007, Scott A. Jones, et al., Chacha Search, Inc.

U.S. Appl. No. 11/652,506, filed Jan. 11, 2007, Scott A. Jones, Chacha Search, Inc.

U.S. Appl. No. 11/780,297, filed Jul. 19, 2007, Scott A. Jones, et al., Chacha Search, Inc.

U.S. Appl. No. 11/780,241, filed Jul. 19, 2007, Scott A. Jones, et al., Chacha Search, Inc.
U.S. Appl. No. 11/819,719, filed Jun. 28, 2006, Scott A. Jones, et al., Chacha Search, Inc.
U.S. Appl. No. 11/835,016, filed Aug. 7, 2007, Scott A. Jones, et al., Chacha Search, Inc.
U.S. Appl. No. 11/834,911, filed Aug. 7, 2007, Scott A. Jones, Chacha Search, Inc.
U.S. Appl. No. 11/777,505, filed Jul. 13, 2007, Scott A. Jones et al., Chacha Search, Inc.
U.S. Appl. No. 11/652,506, filed Jan. 12, 2007, Scott A. Jones et al., Chacha Search, Inc.
U.S. Appl. No. 11/819,719, filed Jun. 28, 2007, Scott A. Jones et al., Chacha Search, Inc.
International Search Report issued Jan. 28, 2008 in PCT/US07/75369.
International Search Report issued Feb. 12, 2008 in PCT/US07/60467.
International Search Report issued Feb. 27, 2008 in PCT/US07/60459.
International Search Report issued Feb. 15, 2008 in PCT/US07/60468.
International Search Report issued Feb. 7, 2008 in PCT/US07/60472.
Carmel et al., "Searching XML Documents via XML Fragments," 2003, ACM, pp. 151-158.
Karat et al., "Patterns of Entry and Correction in Large Vocabulary Continuous Speech Recognition Systems," 1999, ACM, pp. 568-575.
Google Tutor, "Googling from your Mobile Phone—no Web Browser Needed!," 2005, Google Tour.
Varshney et al., "Voice Over IP," 2002, Communications of the ACM, vol. 45, No. 1, pp. 89-96.
Knoblock, Craig A., "Searching the World Wide Web," 1997, IEEE Expert, pp. 8-14.
Sullivan, Danny, "Google Launches Personalized Home Page," Search Engine Watch, May 2005.
Office Action dated May 13, 2008 issued in U.S. Appl. No. 11/336,928.
Office Action dated Sep. 2, 2009 issued in U.S. Appl. No. 11/336,928.
International Preliminary Report on Patentability dated Aug. 7, 2008 issued in PCT/US2007/060472.
Search Report dated Feb. 7, 2008 PCT/US2007/060472.
Corrected Search Report dated Jun. 2, 2008 PCT/US2007/060472.
International Preliminary Report on Patentability dated Aug. 7, 2008 issued in PCT/US2007/060459.
Search Report dated Feb. 27, 2008 issued in PCT/US2007/060459.
Office Action dated Aug. 20, 2008 issued in U.S. Appl. No. 11/469,732.
Office Action dated Mar. 31, 2009 issued in U.S. Appl. No. 11/469,732.
Office Action dated Jun. 7, 2010 issued in U.S. Appl. No. 11/469,732.
Office Action dated Feb. 1, 2010 issued in U.S. Appl. No. 11/469,732.
Office Action dated Aug. 20, 2009 issued in U.S. Appl. No. 11/469,732.
Search Report dated Feb. 12, 2008 Issued in PCT/US2007/060467.
International Preliminary Report on Patentability dated Aug. 7, 2008 Issued in PCT/US2007/060467.
Office Action dated Feb. 24, 2009 issued in U.S. Appl. No. 11/647,437.
Office Action dated Oct. 28, 2009 issued in U.S. Appl. No. 11/647,437.
Office Action dated May 26, 2009 issued in U.S. Appl. No. 11/647,437.

International Preliminary Report on Patentability dated Aug. 7, 2008 issued in PCT/US2007/060468.
Search Report dated Feb. 15, 2008 issued in PCT/US2007/060468.
Office Action dated Jun. 22, 2010 issued in U.S. Appl. No. 11/626,173.
Office Action dated Jun. 22, 2009 issued in U.S. Appl. No. 11/626,173.
Office Action dated Dec. 1, 2009 issued in U.S. Appl. No. 11/626,173.
Office Action dated Nov. 7, 2008 issued in U.S. Appl. No. 11/626,173.
First Chinese Office Action issued on May 12, 2010 for copending Chinese Patent Application No. 200780010282.1.
First Chinese Office Action issued on Jul. 8, 2010 for copending Chinese Patent Application No. 200780010330.7.
First Chinese Office Action issued on May 13, 2010 for copending Chinese Patent Application No. 200780010299.7.
First Chinese Office Action issued on May 12, 2010 for copending Chinese Patent Application No. 200780010292.5.
Kenney et al. "Google Meets eBay", D-Lib Magazine, vol. 9 No. 6, Jun. 2003.
"CHI Image Sorting", Google Blogoscoped, Mar. 28, 2005, http://blog-outer-court.com/archive/2005-03-28-n53.html.
"Amazon's Mechanical Turk", Google Blogoscoped, Nov. 4, 2005, http://blog.outer-court.com/archive/2005-11-04-n69.html.
Yochai Benkler, "Coase's Penguin, or, Linux and The Nature of the Firm", The Yale Law Journal, vol. 112, 2002.
"CHI, a Collaborative Human Interpreter", Google Blogoscoped, Mar. 25, 2005, http://blog.outer-court.com/archive/2005-03-25-n43.html.
New Zealand Patent Office Examination Report issued on Jan. 19, 2010 for copending New Zealand Patent Application No. 570640.
New Zealand Patent Office Examination Report issued on Jan. 19, 2010 for copending New Zealand Patent Application No. 570671.
New Zealand Patent Office Examination Report issued on Dec. 17, 2010 for copending New Zealand Patent Application No. 570644.
New Zealand Patent Office Examination Report issued on Jan. 19, 2010 for copending New Zealand Patent Application No. 570643.
European Patent Office Communication dated May 12, 2009 for copending European Patent Application 07717987.7.
European Patent Office Communication dated May 12, 2009 for copending European Patent Application 07762604.2.
European Patent Office Communication dated May 12, 2009 for copending European Patent Application 07762508.5.
Koffey, N. "Webhelp.com answers with a personal touch" Nov. 30, 1999, pp. 1-2.
First Chinese Office Action issued on Oct. 21, 2010 for copending Chinese Patent Application No. 200780010330.7.
Second Chinese Office Action issued on Nov. 11, 2010 for copending Chinese Patent Application No. 200780010292.5.
Australian Office Action dated Mar. 29, 2011, for copending Australian Application No. 2007206022 (U.S. Appl. No. 11/336,928, PCT No. PCT/US2007/060472).
Australian Office Action dated Mar. 29, 2011, for corresponding Australian Application No. 2007208181 (U.S. Appl. No. 11/647,286, PCT No. PCT/US2007/060459).
Australian Office Action dated Mar. 23, 2011, for copending Australian Application No. 2007211160 (U.S. Appl. No. 11/647,437, PCT No. PCT/US2007/060468).
U.S. Office Action dated Mar. 16, 2011, for copending U.S. Appl. No. 11/336,928.

* cited by examiner

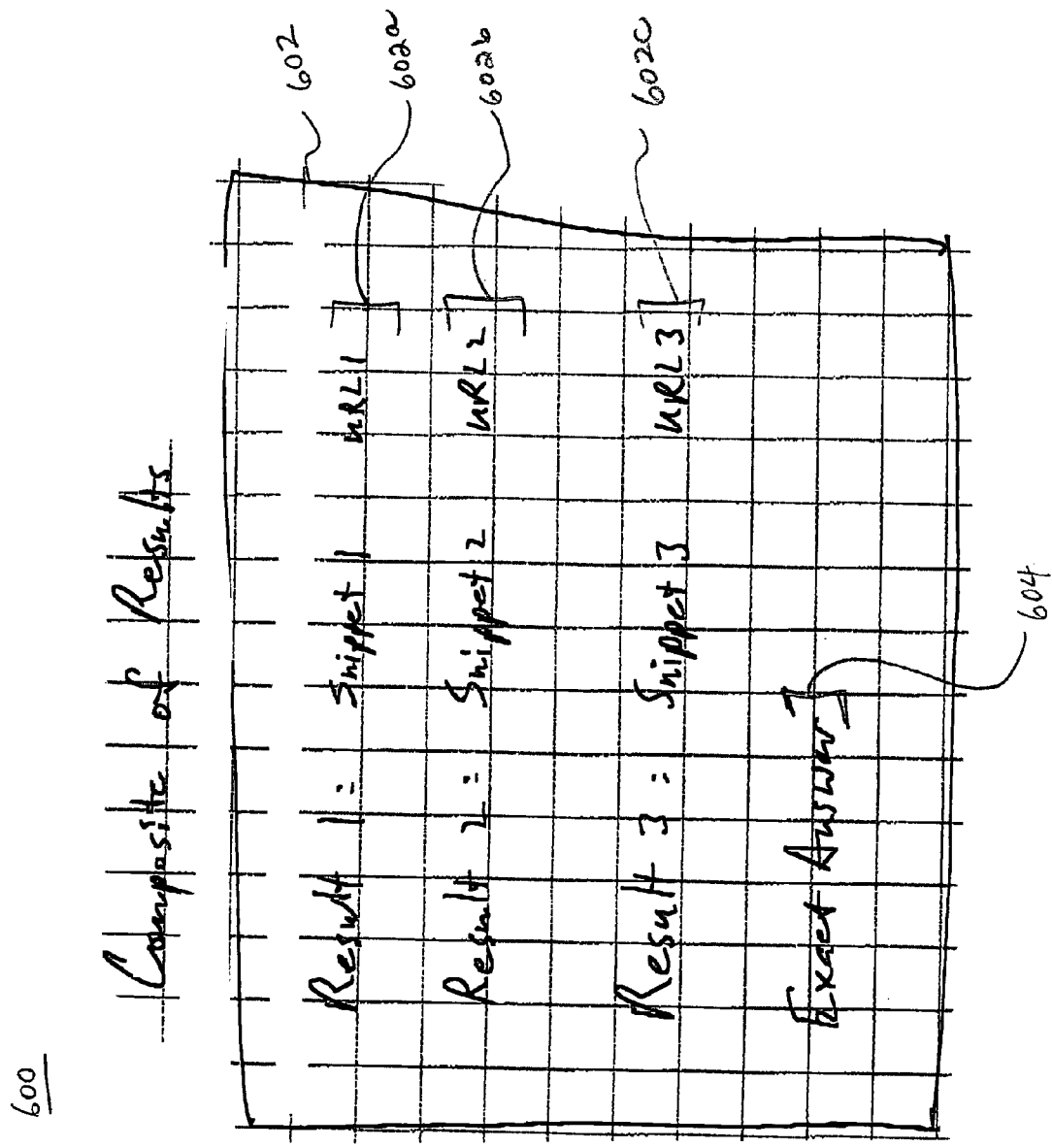

AUTOMATED TOOL FOR HUMAN ASSISTED MINING AND CAPTURING OF PRECISE RESULTS

CROSS-REFERENCE TO RELATED APPLICATIONS

This application is related to and claims the benefit of U.S. Application Serial No. 60/807,428, filed Jul. 14, 2006, inventor Scott A. Jones, et al., titled AUTOMATED TOOL FOR HUMAN ASSISTED MINING AND CAPTURING OF PRECISE RESULTS and is a continuation-in-part of U.S. application Ser. No. 11/336,928, titled A SCALABLE SEARCH SYSTEM USING HUMAN SEARCHERS, inventor Scott A. Jones, filed Jan. 23, 2006, in the United States Patent and Trademark Office, the disclosures of both of which are incorporated herein by reference.

BACKGROUND

1. Field

The present invention is directed to human assisted searches and, more particularly, to an automated tool for human assisted mining of search results for the purpose of returning a precise result in response to a search request.

2. Description of the Related Art

A resource such as a search engine, e.g., Google®, Clusty®, Yahoo®, etc., may be utilized to submit a request for information that meets particular criteria and retrieve desired information from results returned in response to the request. Due to the vast amount of information available over the Internet, locating information using a search engine requires accurately formulating a query or a keyword(s) for a search requested. However, typical search engines fetch as many web pages as possible in which a requested keyword or query appears and generally require additional searching of the web pages to obtain desired information.

In situations where results returned from an initial search using a search engine do not produce desired information, subsequent searches using other search engine(s) may be performed. However, these subsequent searches require repeating the search and browsing through returned results to locate the desired information. While meta search engines such as Jux2™, Dogpile®, etc., query various search engines and return results from the search engines, all known meta search engines, Internet directories and other similar technologies provide comprehensive listing of web pages containing a requested keyword or query and require user to browse through results to obtain desired information. Typically additional searching of the results is required, especially when the desired information requires accessing a web page produced as a result of a search and running a process or routine made available via the web page such as converting a value, translating a word or sentence of one language into another, etc. to obtain the desired information.

The above-discussed problems are further exacerbated for users of devices such as cellular phones because current search engines return search results that are often irrelevant to what the users desire to know and require the users to interact and view contents of listed web sites or modify and re-enter queries to obtain relevant results. Cellular phone users are sometimes frustrated by the limited display capability and awkward input methods of cellular phones, which further complicates the search function when using a cellular phone.

Although various types of search engines and other resources are available for locating information, there is a need for a tool that provides relevant, focused and accurate information to users from a broad base of knowledge and information.

SUMMARY

A method and system are disclosed for passing a request to a resource, building a response based on a selection of a human provider from results returned from a search via the resource and delivering the response as a result of that request.

The method and system include retrieving information by allowing selection of at least two search engines and/or other resources at a time a search is needed and triggering searches with a single query.

The method provided may include activating a resource among available resources, displaying content of the resource generated based on a search via a specialized built-in browser, obtaining information from the content displayed in the built-in browser and providing the obtained information as a response to a request.

A renderer is disclosed for displaying search results of a resource via which a search is performed for a request and formulating a response to the request based on selection from the results in the renderer.

The method and system disclosed may provide a display including a query window showing a search query and at least two windows simultaneously showing search results for that query from at least two search engines.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 12 is an illustration of a display with composite results pertaining to a request.

DETAILED DESCRIPTION OF THE PREFERRED EMBODIMENTS

Figure 1:
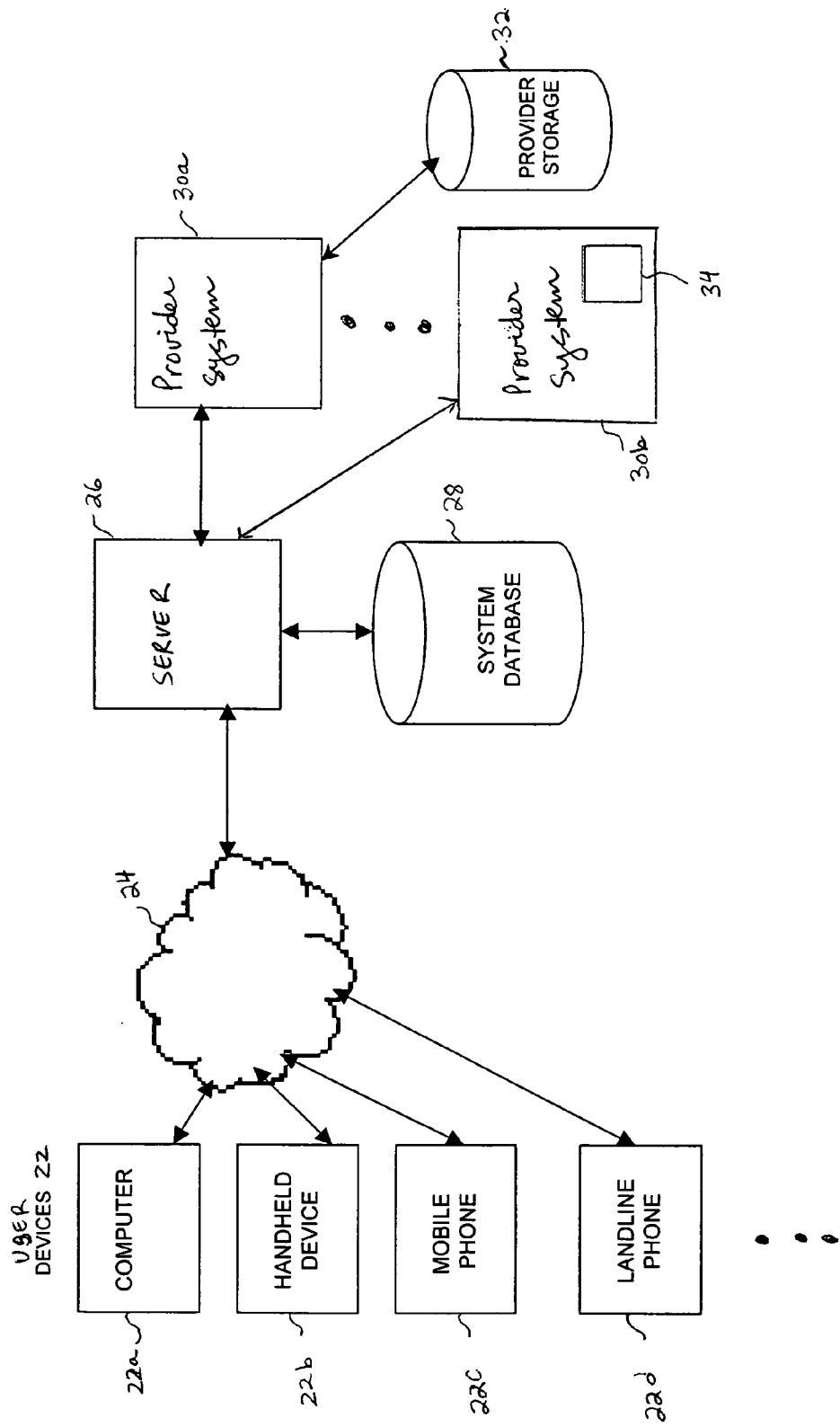
FIG. 1 is a block diagram of a system for receiving requests and transmitting the requests to providers.

Reference will now be made in detail to the present embodiments of the present invention, examples of which are illustrated in the accompanying drawings, wherein like reference numerals refer to the like elements throughout. The embodiments are described below to explain the present invention by referring to the figures. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

An automated tool for human assisted analysis of search results for obtaining precise result(s) as a response to a request is provided by the system illustrated in FIG. 1. A request is a query or keyword(s) submitted from an information seeker and may entail a fully-formed question, sentence, keyword or search phrase, for example, the closing time of a particular restaurant, the winner of the 1960 World Series, information pertaining to a medical illness, or any other type of query. A provider, a guide or paid searcher (PaidSearchers™) is a human searcher who has registered to handle requests, who may be a professional, an amateur and/or volunteer searcher. A requestor (InfoSeekers™) is a user or an entity submitting a request seeking information.

An exemplary system 20 for providing an automated tool for human assisted information mining is illustrated in FIG. 1 and described in detail in the application previously referenced. The system 20 receives requests submitted by information seekers, delivers the requests to providers for processing and returns responses resulting from the processing by the providers to the information seekers. As depicted in FIG. 1, request(s) may originate from user devices 22 including a typical desktop or laptop computer 22a, a handheld device 22b such as a personal digital assistant (PDA), mobile phone 22c, landline phone 22d and a specialized query terminal, or any other source that allows a user to enter a query via text or speech entry and communicate with server 26 via network 24. The user devices 22 may also be typical touch-tone telephones, two-way radios or any other communication device that allows the user to talk over a distance. The communication system can include packet switched facilities, such as the Internet, circuit switched facilities, such as the public switched telephone network, radio based facilities, such as a wireless network, etc.

The server 26 receives requests from the user devices 22 via the network 24 and delivers the requests to provider systems 30 including provider system 30a and provider system 30b. For ease of explanation, provider systems 30a and 30b used by providers are illustrated in FIG. 1, however, the present invention is not limited to any particular number of provider systems. For example, at any given time, the system 20 may have multiple provider systems 30 that are available to process requests from the user devices 22 and deliver responses to the user devices 22. Similar to the user devices 22, the provider systems 30 may be any text or speech-based systems such as a desktop or laptop system, a handheld device such as a PDA, a cellular telephone, a specialized terminal, or any other device that allows a provider to receive and respond to a request submitted via text or speech entry.

As illustrated in FIG. 1, the provider systems 30a and 30b are each provided with storage capability for locally maintaining information respectively using provider storage 32 connected with the provider system 30a and storage 34 integrated with provider system 30b. The provider storage 32 and provider system storage 34 may be used to retain information pertaining to requests received from the user devices 22 via the server 26 and responses to the requests. Storage functionality of the provider systems 30a and 30b is not limited to any particular configuration or recording media and may include any type of temporary or permanent storage technology that is useable to retain data. For example, a provider using the provider system 30a may use a private storage accessible via the Internet (e.g., GoDaddy.com, Yahoo® storage, etc.), the provider storage 32, or any other device that can retain data retrievable at a later time.

When the server 26 receives a request from any of the user devices 22, the server 26 determines which provider(s) registered with the system 20 to handle requests that are currently available, match the request. Each provider may identify at least one category, subcategory, keyword, or area of interest pertaining to which the provider is willing to accept requests. For example, each available provider registered to handle requests pertaining to the category "health" may be identified and ranked against other providers registered for that category according to prior success in responding to requests to assign the request to top ranked available provider(s) within the category. Various types of conditions may be applied to determine provider(s) matching a request for optimizing responses from the provider(s). Further, any criteria discussed in U.S. patent application Ser. No. 11/336,928, titled A SCALABLE SEARCH SYSTEM USING HUMAN SEARCHERS, inventor Scott A. Jones, filed Jan. 23, 2006 may be used.

The server 26 processes arriving search requests (queries) by determining which providers (guides or searchers) are available to search for the information being requested, based upon factors such as the providers being logged in, guides who are signed up for a keyword or category, the ranking of the guide based on previous performance, etc. The server 26 may also determine if a particular query has been queried previously and can send a response to a user with previously obtained search results without necessarily invoking a human provider. For example, a query is matched to one or more previous queries stored in system database 28. This matching may compare, for example, one or more keywords of a current query with one or more keywords of previous queries for an exact, partial or fuzzy (highly similar) match. This can result in several previous queries matching the current query.

The system 20 may also check for additional providers or searchers that have become available since the query was received and send them the query or can send the query to an available provider who has registered for general searches. Alternatively, the system 20 can use a variety of mechanisms such as using thesaurus-like relationships between words to send the query to a searcher that is signed up for a keyword pool that is deemed closest to the user-entered keyword. The system 20 may be configured to set the threshold for the degree of closeness of the user-entered keyword versus the search pool associated with a similar keyword.

The server 26 receives response(s) to a request from one or more the provider systems 30 used by one or more providers and delivers the response(s) to the requesting user device, e.g., user device 22a. The server 26 has access to system database 28 that maintains information of users' requests submitted via the user devices 22, provider(s) registered to handle requests and responding to the requests via the provider systems 30 and responses to the submitted requests.

The system database 28, among other things, stores previous queries (or a subset of previous queries, such as the ones that are still considered relevant to a particular user, wherein said relevance might pertain to time, location, or subject matter), corresponding categories, subcategories and/or keywords that resulted from the previous queries and accepted "relevant" results associated therewith.

The database 28 may include cross-linked entries for query, keyword, provider, user, advertisement, keyword and categories. Within these structures, there are entries for logged-in status of provider or searcher (availability), rank (or weighting) of provider, rank (or weighting) of keyword, provider statistics such as number of searches, number of accepted (by user) searches, user identification (and/or IP address of user), name, address, demographic information about users and providers, search results, advertisements (game, video, text, audio, etc.), advertisement statistics, accounting information, anonymity flags for user and provider, provider availability, query clarification requests, and an indication as to whether the provider is available for general searches, query follow-on, etc. The statistical information for a provider may include the total number of searches, the number of successful searches, the average speed of the provider, the latency of the provider before starting and ending a search, the average number of results returned by the provider, the availability time of the provider, etc.

A provider may sign up for multiple keywords in a query, (e.g. a provider might be signed up for both "baseball" and "world series"), then that greater-keyword provider may take priority over fewer-keyword provider candidates who are only signed up for a lesser number of matching keywords in the search query phrase (e.g. a provider or searcher who is signed up for either "baseball" or "world series" but not both).

If no provider is identified for a query phrase, then the server 26 can forward the query to "generalist searchers" who will attempt to answer queries in any category. Alternatively, the system 20 may shuttle the query to another search engine and/or meta-search engine in an attempt to provide the user with a base level of functionality that is never worse than that of other search engines. The results are passed back to the user. Also, the query may be passed to a system of experts who answer questions on a website such as Google™ Answers or Yahoo™ Answers, and the user may be given a pointer to the location of the query which may be answered in the future. These systems may not give the user real-time feedback, but the user may be informed that he can check back in the future.

Figure 2:
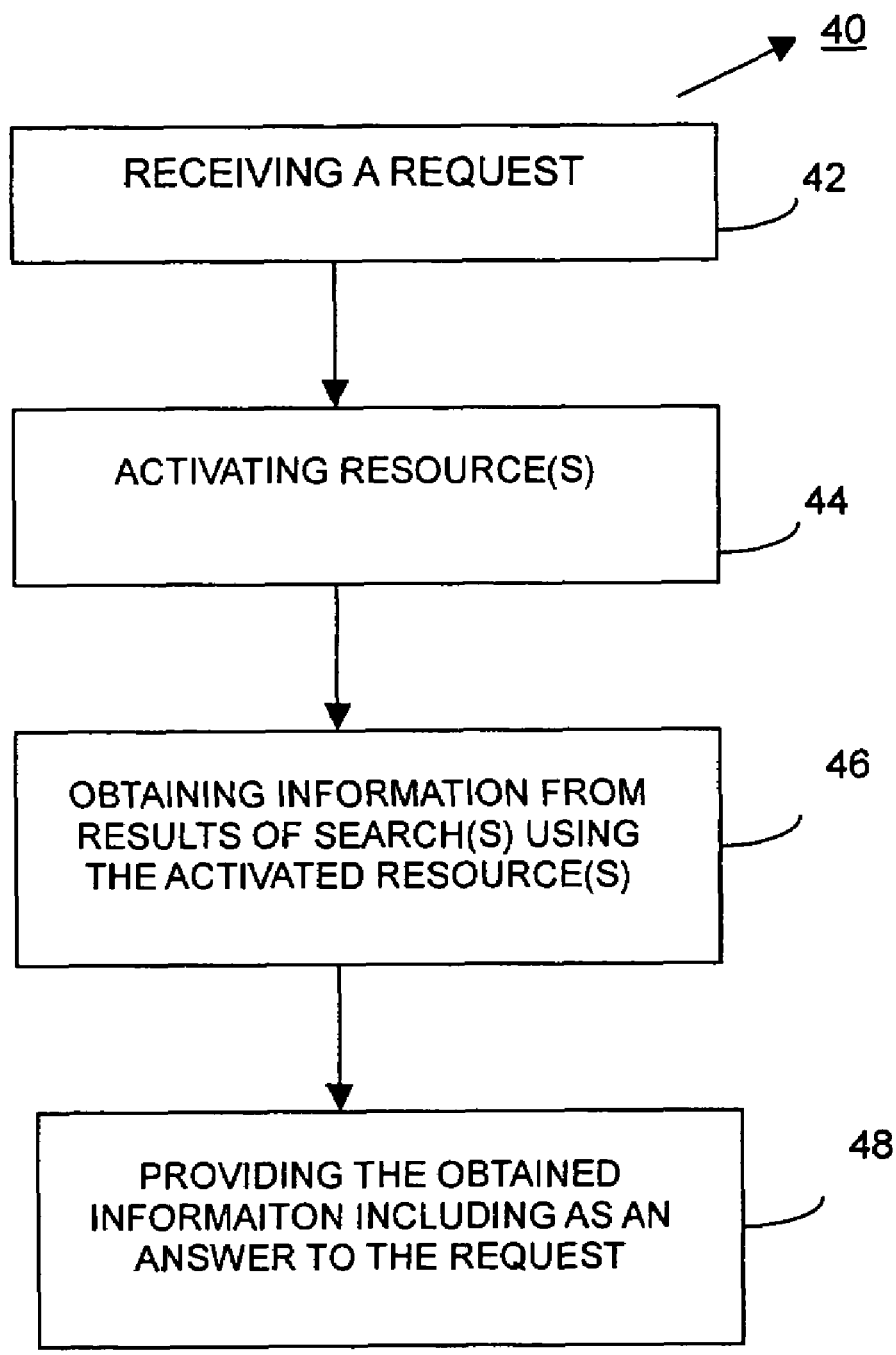
FIG. 2 is a flowchart illustrating obtaining of information from results returned from activated resource(s).

An exemplary process 40 for human assisted information mining is illustrated in FIG. 2. As shown in FIG. 2, process 40 begins with receiving 42 a request. As previously discussed, a request may be any type of inquiry or keyword(s) for which a user (i.e., infoseeker™) is seeking specific or general information. For example, a user may submit a request to obtain the final score of the championship game of the 2006 NCAA Basketball Tournament, or general information pertaining to "diabetes."

Subsequent to receiving 42 the request, process 40 continues by activating 44 resource(s). A provider, a searcher or a guide (i.e., PaidSearcher™) may use various types of tools to perform a search of publicly or privately available information to produce result(s) in response to the request. For example, the provider may use tools such as a browser to access public databases via searches over the World Wide Web, private databases that may be accessible only by the provider such as a database of information previously gathered by the provider, results stored based on previous requests, or from databases that require payment for access or even information available to the provider in non-electronic form, such as a book on the provider's bookshelf, test results from a personal experiment, knowledge base of the provider, etc. In addition, the provider may submit the request or some version of the request to an automated search tool such as Ask.com®, etc, or any other similar system able to respond to questions submitted in natural language. Alternatively, the provider systems 30 may copy the request, place the request into the search field of a search page for a particular search tool, for example, Yahoo®, and transmit the request to the search engines automatically.

The resource(s) activated 44 for seeking information related to a request may also be defined by the system 20 (FIG. 1) based on association of the provider handling the request with a category, keyword or area of interest, resources used by other providers, content of the request, or any other criteria that increases the probability of obtaining an accurate result responsive to the request. For example, a provider registered to handle requests pertaining to the keyword "basketball" may be presented with default resource(s) such as NCAAsports.com, ESPN.com, etc., while another provider handling requests pertaining to the keyword "health" may be provided with WEBMD.com, NIH.gov, etc. Similarly, based on usage of a resource among provider(s) handling requests of a particular keyword (or category), all the provider(s) may be presented with the resource as a default for seeking information pertaining to requests related to the category. In the same manner, a provider may also configure default resource (s) to be used from which that particular provider seeks information for a request. Providers who are associated with the same keyword or category may, in some embodiments, choose to activate different sets of resources. That is, the system 20 (FIG. 1) may be configured to allow provider(s) to flexibly activate resource(s) or may be configured to predetermine particular resource(s) which the provider(s) can activate. Activation of resource(s) for seeking information related to a request is explained in detail below with respect to FIGS. 3, 7 and 9.

After activating 44 resource(s), process 40 of FIG. 2 proceeds to obtaining 46 information from results of search(es) using the activated resource(s). A provider may execute a single search or multiple searches (concurrently or sequentially) using the activated resource(s) for seeking information requested. For example, the provider may be able to perform a search in relation to a non-complex request using one or more of the activated resource(s) while a complex request may require multiple searches including referring to non-electronic information accessible to the provider. Further, an access to a resource may be programmed such that subsequent access to the resource is automatically executed which providers may share with others associated with a category or keyword.

When obtaining 46 information from results of the search (es), a provider analyzes the information content of the results returned from the search(es) to identify pertinent information in relation to the request. The obtained information may be a text based answer and may include a specific answer, comments from the provider, web pages, web links, images, videos, a document, audio recordings or any other request related information acquired by the provider in response to the request. Typically, the information obtained is what the provider may intend to satisfy the needs of the requesting user. For example, the obtained information may be operation hours of a particular type of restaurant in Indiana and may include a web page of the restaurant, advertisements referring to the restaurant, information of other similar restaurants in Indiana, etc. Similarly, in response to the request inquiring the final score of the championship game of the 2006 NCAA Basketball Tournament, the provider may obtain "73-57", "Florida defeated UCLA 73-57", etc.

After the information is obtained 46, process 40 proceeds to providing 48 the obtained information including an answer to the request. The obtained information is provided to a requesting user via whichever of the user devices 22 (FIG. 1) was used to submit the request, or an alternate device, if identified in the request. Providing 48 the obtained information includes transmitting the information using a communication standard supported by a receiving one of the user devices 22. For example, when a user submits a request via a mobile device, a result obtained in accordance with the human assisted search (i.e., provider) is transmitted using wireless application protocol (WAP) enabling web browser services on the mobile device. However, the information transmitted to a requesting user is not limited to any particular protocol or file format and may include hyper-text markup language (HTML) pages conveyed using the hypertext transfer protocol (HTTP) and other formats used to exchange information over a network including JPEG, GIF image formats, voice recordings, plug-ins, etc. Information such as sport scores or a street address may also be returned to the user by the provider's own voice. This may be enabled via a VOIP connection or any other connection that enables the user and the provider to communicate by voice.

Figure 3:
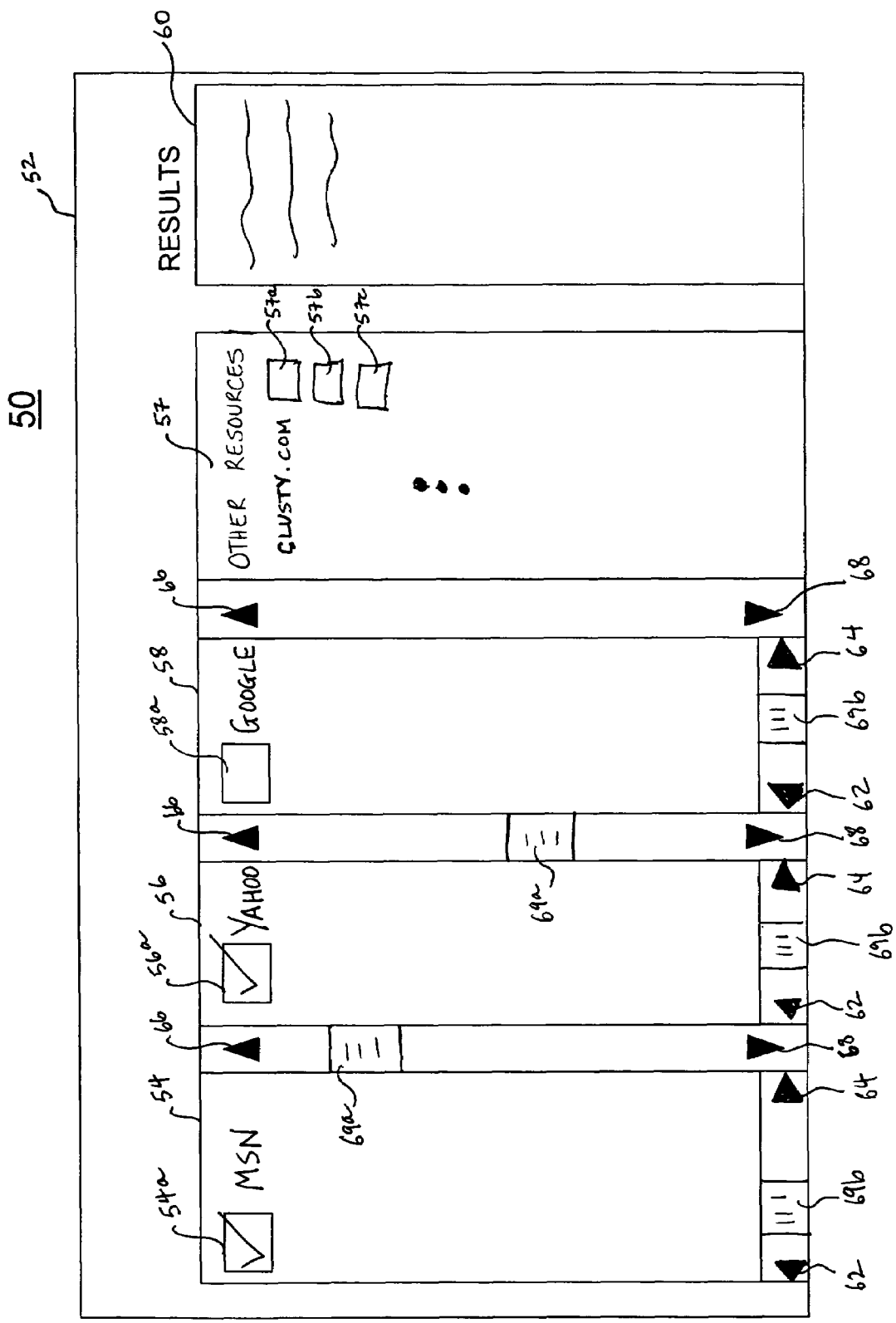
FIG. 3 is an illustration of a display for a search interface for activating one or more resources for seeking information in response to a request.

An exemplary embodiment of a search interface 50 for activating one or more resources to seek information in response to a request is illustrated in FIG. 3. As shown in FIG. 3, a window or frame 52 includes resource windows 54, 56 and 58 configured to display contents produced from a search using MSN®, Yahoo®, Google® search engines, respectively. The "renderer" renders the results in each of the resource windows 54, 56 and 58. The resource windows 54, 56 and 58 display results (search engine results) from each of the resources so that a provider is able to compare, contrast, modify and select from the results to prepare a response to a request. The window 52 may include N number of renderers using which the provider browses results of activated resource(s). For example, each of the resource windows 54, 56 and 58 may be an HTML renderer for displaying web pages resulting from a search using the MSN®, Yahoo® and Google® search engines, respectively. The resource windows 54, 56 and 58 may display information including text, images, links, videos, HTML, XML, XHTML, cascading style sheets, Java Script, etc., or other electronic data available over the Internet and/or from a local network.

The resource window 52 may be generated by an application program producing embedded HTML renderers to display results of a search using one or more of the resources to obtain information in response to a request. For example, an application enabling a provider or paid searcher to utilize search engines and other resources for obtaining information for a request submitted from a user or an infoseeker discussed in application Ser. No. 11/336,928 may be used. For example, an application program used by a provider embeds a default browser specified for an account of the provider upon registration to the system 20 (FIG. 1) is executed. Accordingly, if Internet Explorer (IE) is configured as the default browser for a provider, each resource will be launched in separate instances of IE within the application program used by the provider.

The provider systems 30 may be implemented as a browser-based thin client that allows all of the significant processing, data flow, various information source connections, and data manipulation to occur at the server 26 (FIG. 1). However, preferably, the provider systems 30 are implemented via a locally dynamic application that might run standalone or might run in the context of a browser. There are many examples of locally dynamic applications that do significant processing on the client side (in this case, provider systems 30) while relying on data structures that exist on a server (in this case, the server 26 connected to the system database 28). Some examples of locally dynamic applications include Google Earth (web-based mapping software), implemented using AJAX (Asynchronous Java combined with XML), and Basecamp (web-based project management software), implemented using "Ruby on Rails".

A provider may activate any of the resource windows 54, 56 and 58 and thereby pass the request to the resources (e.g., search sites) using selection boxes 54a, 56a and 58a, respectively. The selection boxes 54a, 56a and 58a indicate (i.e., via checkmark) resource(s) that are currently activated. For example, as illustrated in FIG. 3, selection boxes 54a and 56a contain a checkmark indicating that the MSN® and Yahoo® search engines are activated while the lack of a checkmark in the selection box 58a indicates that the Google® search engine is not activated. For ease of explanation, FIG. 3 shows an instance where the provider has three resources of which two are activated, however, the present invention is not limited to any particular number of resources from which a provider can select for activation. For example, a provider may be provided with multiple HTML renderers to correspond to various search engines, Internet directories such as Yahoo!® Directory, Open Directory Project (DMOZ), etc., and other resources available to the provider. Other resources may be easily tapped by clicking on a resource link provided which fires off a query string (as provided by the user originally and/or as modified by the provider) to that resource in a frame or window where the web page is rendered. Literally hundreds of resources may be associated with a keyword (perhaps submitted by peer providers in the system 20 (FIG. 1) and/or defined by a system administrator and/or by users of the system 20). All of the resources may be easily accessed via the search interface 50 or tool.

The window or frame 52 may include additional resources window 57 providing access to other resources defined for or associated with a category or keyword using selection boxes 57a through 57c. Access to the other resources may also be provided in the resources window 57 in a form of a link, URL, etc., pointing to the resources. For example, in addition to resources displayed in resource windows 54, 56 and 58, there might be other resources that are defined by other providers associated with a keyword that a particular provider may select from using selection boxes 57a through 57c. The provider may be restricted to selecting a finite number of resources to be displayed in the window 52. For example, a provider may select to use the Clusty® search engine to execute a search by clicking on selection box 57a which causes a query submitted to the MSN® and Yahoo® search engines to be passed to Clusty® such that the provider is able to retrieve information or "drill-down" to relevant information from results returned.

The resource windows 54, 56 and 58 also include graphical user interface (GUI) elements 62, 64, 66, 68, 69a and 69b for viewing contents displayed within the resource windows 54, 56 and 58. Specifically, GUI elements 62 and 64 enable scrolling from one side of the resource windows 54, 56 and 58 to another, GUI elements 66 and 68 enable scrolling up and down within the resource windows 54, 56 and 58 and GUI elements 69a and 69b provide quicker navigation within the resource windows 54, 56 and 58.

The window 52 shown in FIG. 3 includes a results section 60 for displaying a result compiled by a provider as the provider obtains information from resource(s) in response to a request. For example, as a provider is obtaining information from the resource windows 54 and 56 to be provided to a requesting user, the obtained information may be displayed in the results section 60. The results section 60 may display partial or complete results based on progress of the provider in obtaining information in response to the request.

Figure 4:
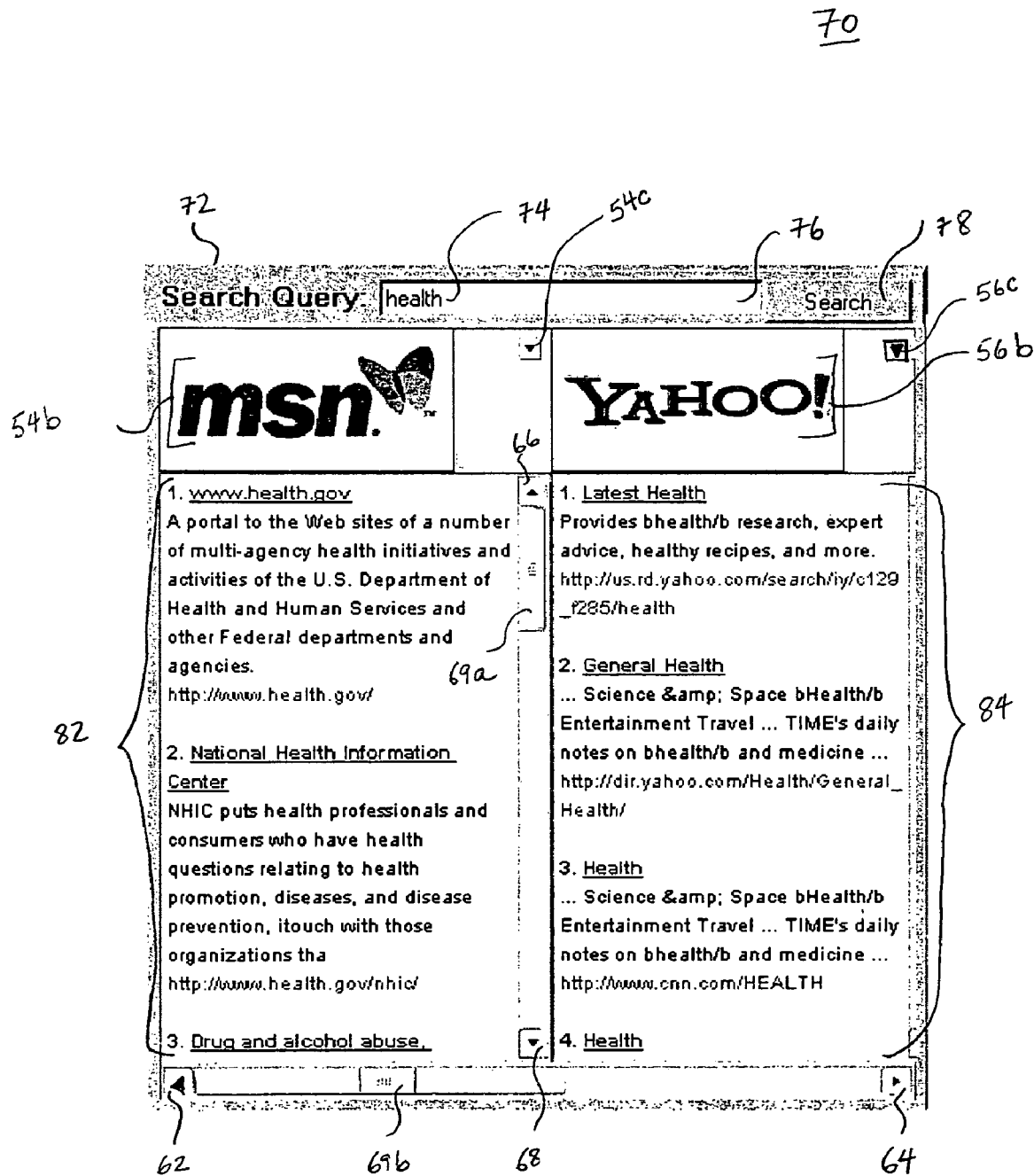
FIG. 4 is an illustration of a search interface with results returned from activated resources in response to a request.

An exemplary search interface 70 for displaying results from activated resources is illustrated in FIG. 4. As shown in FIG. 4, the search interface 70 includes a window 72 displaying search results from a search conducted using resources 54b and 56b, which in this case are MSN® and Yahoo® search engines, respectively. The window 72 includes search query entry field 76 enabling entry of keyword 74 to identify the object of the search, which may be modified as needed to trigger a new search by selecting button 78. For example, when the keyword 74 "health" is changed based on entry of a different query or keyword in the search query entry field 76, search results 82 acquired from resource 54b (MSN®) and search results 84 acquired from resource 56b (Yahoo!®) are changed to reflect results for the different query or keyword.

Similar to the window 52 in FIG. 3, the search interface 70 includes GUI elements 62, 64, 66, 68, 69a and 69b to allow viewing contents in the window 72 by adjusting information of the search results 82 and 84 returned from the resources 54b and 56b. Further, the window 72 includes GUI elements 54c and 56c for minimizing and restoring the search results 82 and 84, respectively.

Figure 5:
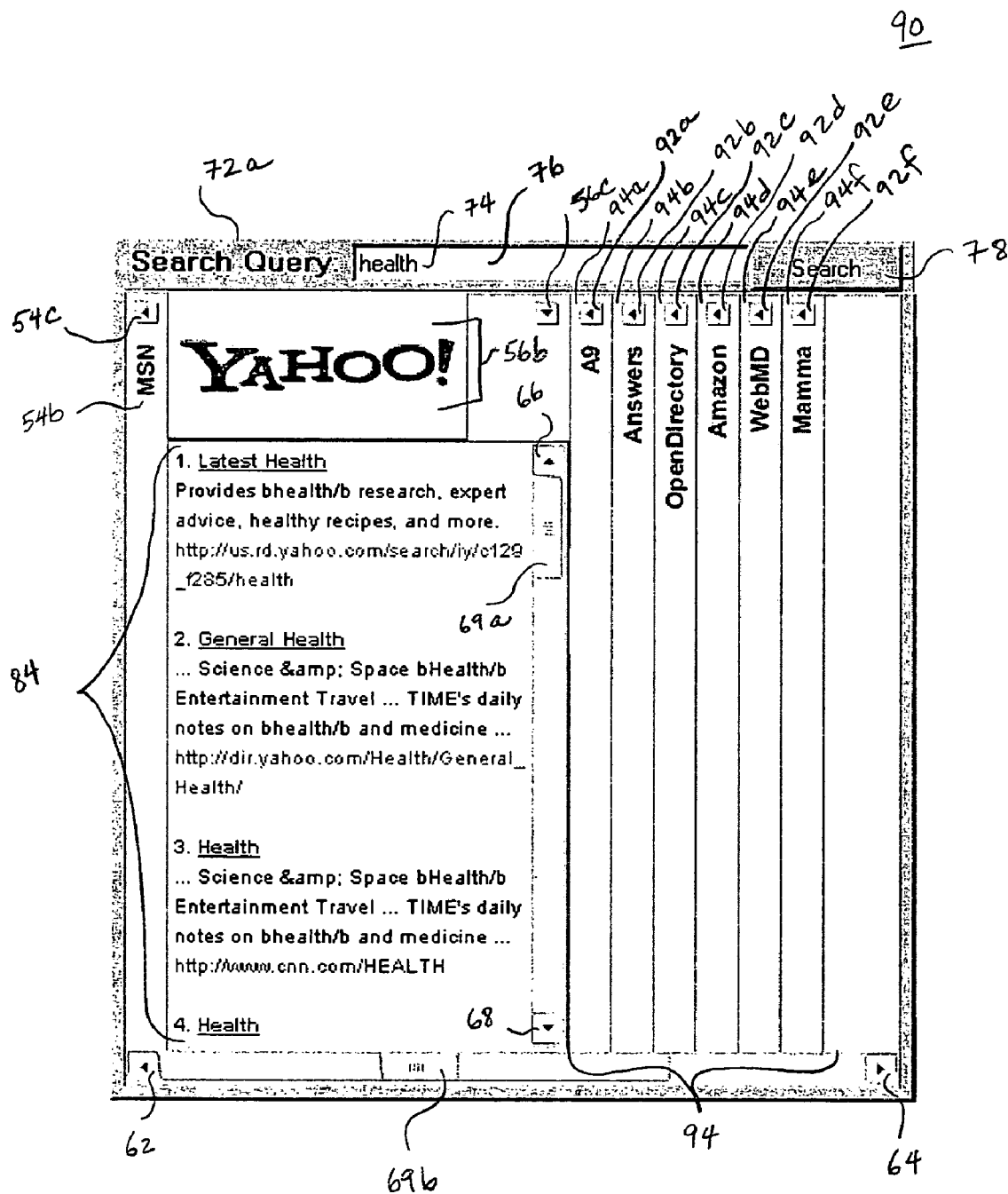
FIG. 5 is an illustration of a search interface with results returned from multiple resources in response to a request.

Another exemplary search interface 90 displaying multiple resources is illustrated in FIG. 5. As shown in FIG. 5, the search interface 90 includes a window 72a having activated resources 54b, 56b and 94. The resources 94 includes resource windows 94a through 94f rendering information of A9®, Answers, OpenDirectory, Amazon®, WebMD® and Mamma™ which are activated in conjunction with resources 54b and 56b for executing a search in relation to the keyword 74 "health." The resource windows 94a through 94f include buttons 92a through 92f using which the resource windows 94a through 94f may be conventionally displayed more fully (restored). For example, button 56c may be used to minimize search result 84 rendered via the resource window 56b, while buttons 54c and 92a through 92f may be used to restore the resource windows 54b and 94a through 94f, respectively, to display the search results.

While the majority of the resource windows 54b, 56b and 94 shown in FIG. 5 are search engines, resources used for seeking information in response to a request are not limited to search engines. For example, resource 94c DMOZ and/or other web directories as well as commercial or informational web sites like Amazon® 94d and WebMD® 94e may be used to conduct a search. The provider may also obtain information from private databases and other sources accessible to the provider to search for information to respond to a request. Further, the window 72a includes GUI elements 62, 64, 66, 68, 69a and 69b to adjust viewing of information contained in the resource 54b, 56b and 94.

Figure 6:
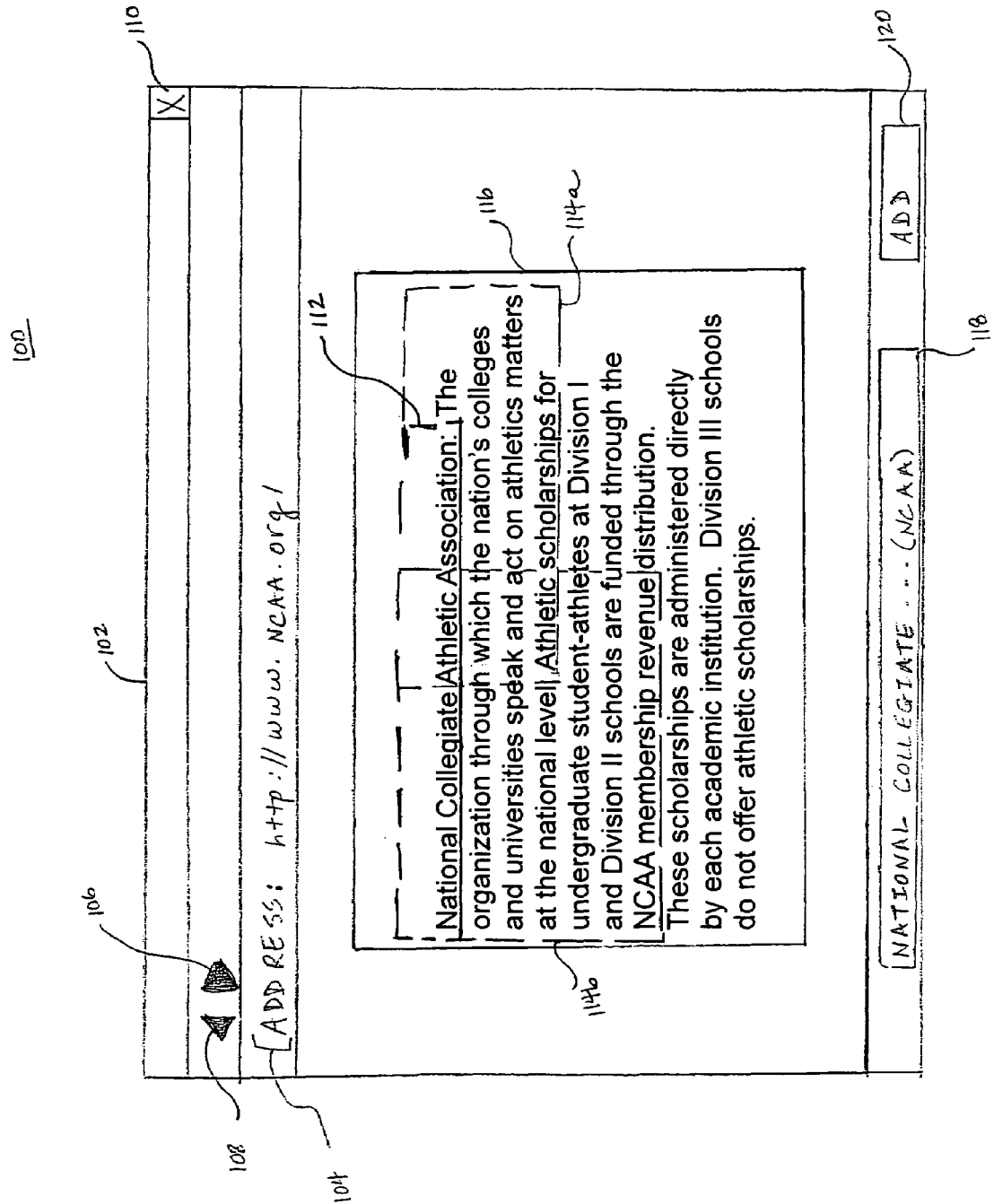
FIG. 6 is an illustration of a search interface for capturing a result.

An exemplary search interface 100 for capturing a result is illustrated in FIG. 6. As shown in FIG. 6, the search interface 100 includes a window 102 configured to allow a provider to analyze information resulting from a search across activated resource(s), compare the information and obtain selected contents of the information from each resource for building a response to be presented to a requesting user (i.e., information seeker). The window 102 includes a close button 110 for conventionally exiting or closing the window 102 displaying information of a resource. For example, a provider may switch from information resulting from one resource to another by using the close button 110.

The search interface 100 includes a next button 106 and a previous button 108 for conventionally navigating through information resulting from a single resource or multiple resources. For example, the next and previous buttons 106 and 108 may be used to navigate through web page contents resulting from a search of Yahoo® and/or switch between navigating from web page contents of Yahoo® and MSN®. The next button 106, the previous button 108 and the close button 110 may be similar to typical graphical user interfaces of application programs that provide navigational capabilities.

The search interface 100 may include a URL, a link, etc., identifying a location of a result. For example, as shown in FIG. 6, URL 104 of results 116 obtained from Yahoo® may be indicated as the provider seeks information in response to the request or pages through the results using the next button 106. The URL identifying a location of obtained information may also be provided in a response to a user (InfoSeeker™). The URL may include an index to a particular location within a web page where the relevant information and surrounding text (referred to herein as a "snippet") is located when the HTML on the page includes tags with this information. In such cases, when the provider obtains information from a particular location on a web page, a corresponding index page tab is identified and provided with the URL to direct a recipient to the location of the obtained information within the page. For example, if a particular bit of pertinent information from a particular web page is located at the bottom of a web page and the provider had to scroll to the bottom of the web page to obtain information, the provider may forward the URL of the web page including an index to allow the recipient to view the information on the bottom of the web page without having to scroll to locate the information. This means that the InfoSeeker™ is able to quickly view the pertinent information on the web page found by the provider with minimal scrolling, even on a small display screen, such as a mobile phone.

As shown in FIG. 6, the result 116 from a resource includes an answer 112 included in related context (or snippet) 114a and 114b. For example, when a user asks what "NCAA" stands for, a provider executes the search using, e.g., pre-configured resource(s), obtains the answer "National Collegiate Athletic Association (NCAA)" and may include surrounding text or related context of the answer. The context 114 may include text (or graphics) related to the answer 112 or may simply be text adjacent to the answer 112. The answer 112 and the context 114 may be text including comments from the provider, web pages, links, images, videos, audio recordings or any other information that may be transmitted to a requesting user from the provider as a response to a request.

In a preferred embodiment, the "answer" 112 is displayed with a different display mode than the context 114 to allow the provider to distinguish between information containing the query or keyword of a request and context information. For example, the answer 112 may be highlighted with a different color than the block of text containing the context 114a and 114b. The provider may use various conventional ways to select the answer 112 and the context 114 from the results 116 in building the response to the request, such as dragging a cursor over selected content and selecting add button 120, single clicking over what the provider wants to return as the answer 112 and double clicking over the context 114, blocking/copying, etc. The results 116 may include images, videos, a document, audio recordings or any other information that may be included by a provider in a response obtained for the request.

When the provider selects information from the results 116, the selected information content may be displayed in an entry field 118 containing information to be included in a response to the request upon selection of the add button 120. For example, the provider double clicks on the answer 112 "National Collegiate Athletic Association" which causes the snippet 114 including answer 112 to appear in the entry field 118 and clicks on the add button 120 to build a response for a request seeking information on "NCAA." Alternatively, the answer 112 may be selected from the resource by double clicking on a word, selecting a phrase by dragging the mouse over word(s), selecting the word(s) by moving the cursor to the location in the page and pressing the shift-key while continuing to move over the words, etc.

Figure 7:
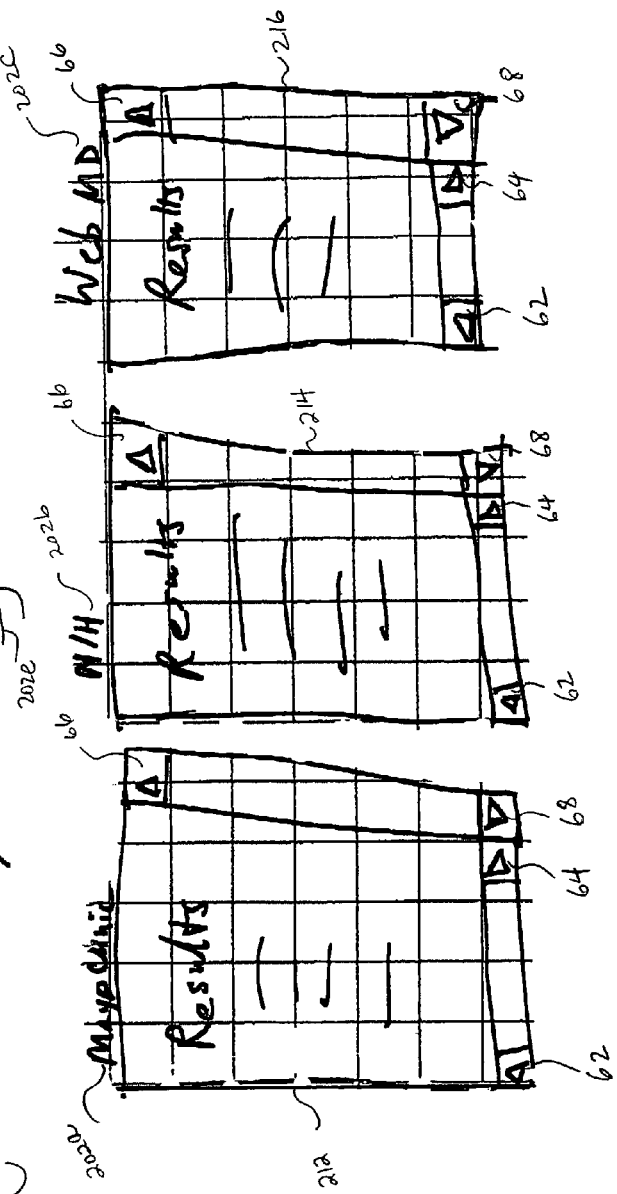
FIG. 7 is an illustration of an interface enabling selection of resource(s) for a request from available resources.

An exemplary user interface 200 enabling selection from available resources is shown in FIG. 7. As shown in FIG. 7, for query or keyword(s) 74b of "prostate cancer", a set of resources 202 including mayoclinic.com 202a, NIH.gov 202b, WebMD.com 202c, Google.com 202d and Yahoo.com 202e are available for selection. Availability of a resource may be determined based on a variety of criteria such as usage of the resource by other providers registered to handle requests pertaining to the same or similar category, popularity of a resource among all providers, reliability of a resource in returning pertinent results, etc. It is also possible to have different sets of resources for different keywords or categories for which a provider is registered.

The user interface 200 also displays information of the set of resources 202 including a rank 204 having indicators 206 and a selection option 208 having indictors 210 for each of the resources available for the keyword(s) 74b. The indicators 206 identify ranking of each resource in comparison to other resources indicated in the set of resources 202. For example, the resource mayoclinic.com 202a is ranked first and the resource Yahoo.com 202e is ranked fifth among the set of resources 202. The selection option 208 includes indicators 210 indicating whether a resource to receive a query has been selected as illustrated by the checkmark indicated for resources 202a, 202b and 202c and the lack of a checkmark for resources 202d and 202e. Similar to the GUI elements 62, 64, 68 and 66 (FIG. 3), search result renderers 212, 214 and 216 in FIG. 7 include GUI elements 62, 64, 66 and 68 to allow a provider to adjust information displayed in the search result renderers 212, 214 and 216.

Accordingly, when a search is conducted for the keyword(s) 74b of "prostate cancer" using activated resources 202a, 202b and 202c, search result renderers 212, 214 and 216 are provided, respectively. The search result renderer 212 contains results of mayoclinic.com for the keyword(s) 74b while search result renderers 214 and 216 contain results of NIH.gov and WebMD for the keyword(s) 74b, respectively. For example, Appendix A incorporated herein by reference illustrates results returned for a search conducted using the keyword(s) 74b of "prostate cancer" via resource 202a and Appendices B and C also incorporated herein by reference illustrate results returned for a search conducted via resources 202b and 202c for the keyword(s) 74b. As such, any additional searching that would have been required for an information seeker to obtain desired information pertaining to the keyword(s) 74b would be eliminated because the provider analyzes the returned results and captures accurate information to present to the information seeker.

Figure 8:
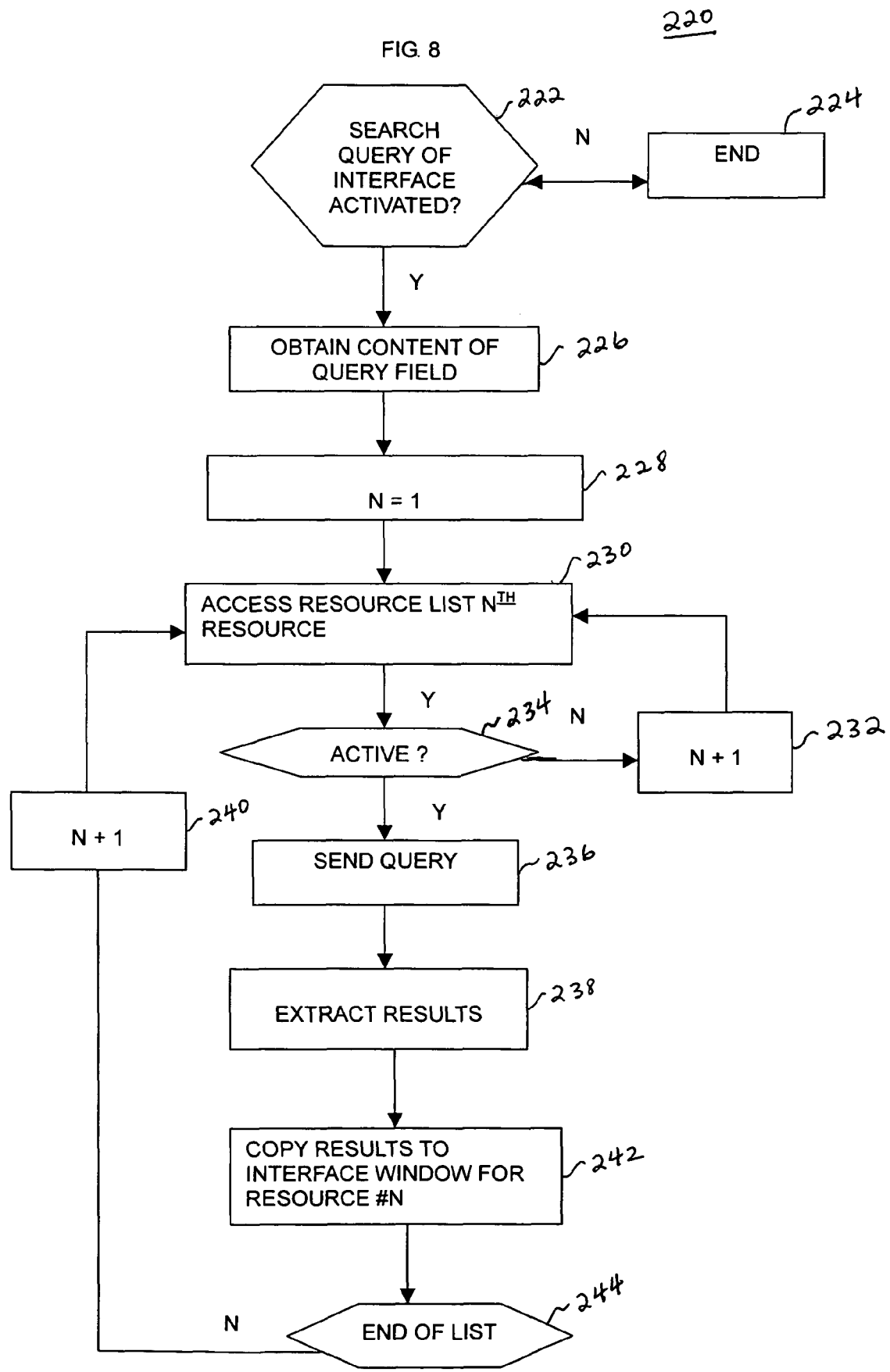
FIG. 8 is a flow chart for sending a query to activated resource(s).

FIG. 8 illustrates process 220 for sending a query to activated resource(s). As shown in FIG. 8, process 220 begins with determining whether search query of interface is activated 222. The search query interface is activated 222, for example, when a user (infoseeker™) using one of the user devices 22 (FIG. 1) submits a query to trigger a search. When it is determined that the search query interface is not activated 222, process 220 ends 224. On the other hand, upon determining that the search query interface is activated 222, content of query field is obtained 226.

After obtaining 226 content of the query field, process 222 moves to setting 228 N=1. For example, as illustrated in FIG. 3, two resources such as MSN® and Yahoo® may be activated by a provider for executing a search for a particular query submitted by a requestor. After setting 228 the number of resources, process 220 moves to accessing 230 resource list $N^{th}$ resource. For example, five resources may be activated for a search pertaining to the category "soccer", in which case, process 220 goes through the list of resources and checks active 234 status of each resource and incrementing N (232) if the resource is inactive. Process 220 continues to sending 236 query "soccer" to active 234 resource(s) and extracting 238 results from the activated resource(s).

Subsequent to extracting 238 results from the activated resources, process 220 continues to copying 242 results to interface window for resource #N. For example, results returned from a search using Mayoclinic.com as a resource in response to a query pertaining to "prostate cancer" are copied to interface window. How resources are listed or presented to a provider and how results are returned from selected resources are displayed is explained in detail below with respect to FIG. 9.

Process 220 determines whether end of the list 244 of resources is reached and continues to check active resources by accessing 230 the list of resources where N is incremented to N+1 (240) upon determining that the end of the list 244 has not been reached.

Figure 9:
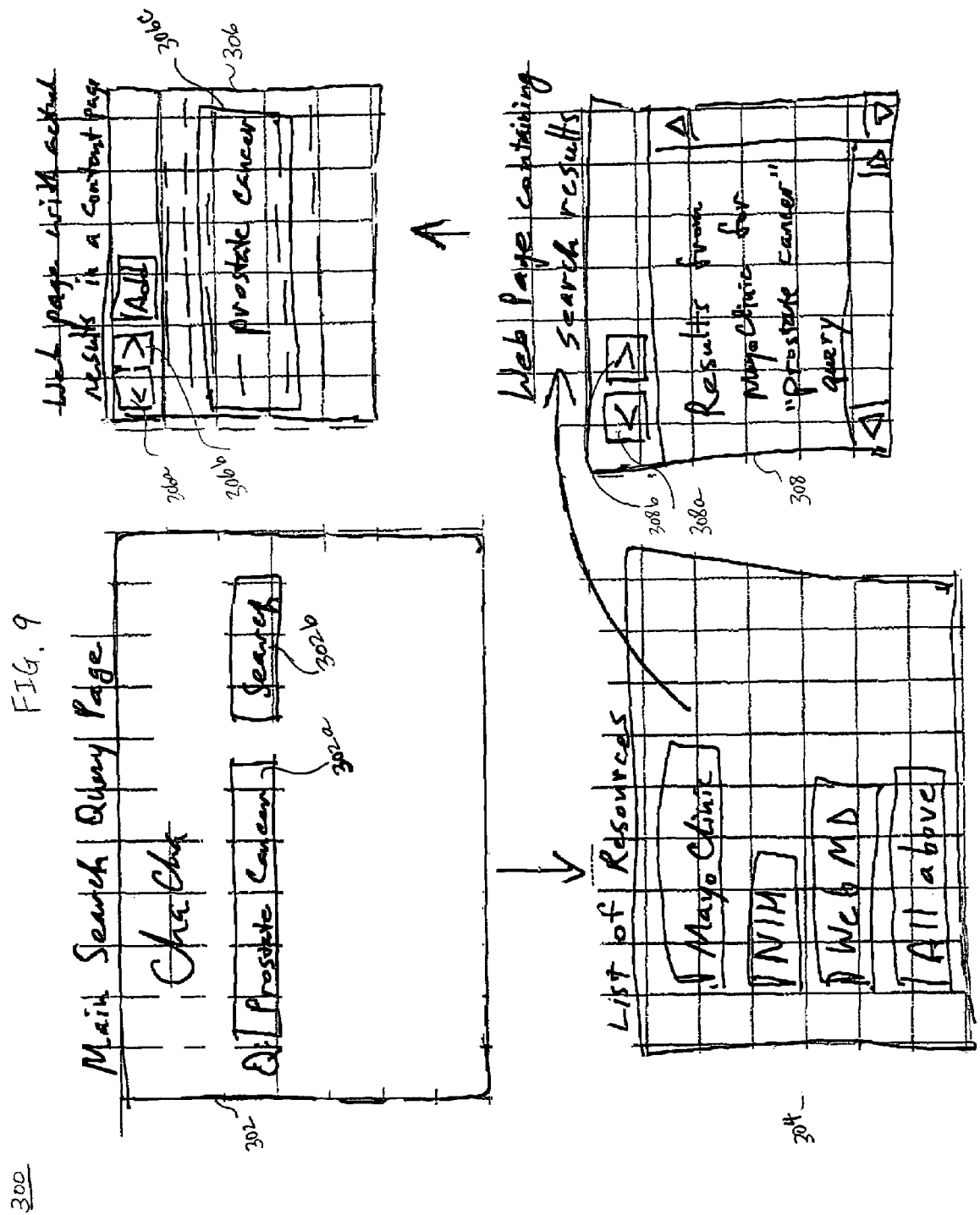
FIG. 9 is an illustration of a search interface using selected resources and mining through results of the resources.

FIG. 9 illustrates an interface 300 for conducting a search using selected resources and mining through results of the resources. As shown in FIG. 9, main search query page 302 includes an input field 302a for entering a query or search request and a button 302b for submitting the query to execute a search. Upon submission of the query for the search, the provider will be presented with a list of resources 304 to which the query may be passed for the search. The list of resources 304 presented to the provider may be predefined in accordance with the query or keyword(s) in a request, a provider's preferences, use by other providers, or any other criteria that increases the probability of obtaining a precise result. For example, when the most frequently used resources for conducting a search in relation to the category prostate cancer are the Mayoclinic, NIH, WebMD web pages, these resources are automatically presented to the provider when a query directed to "prostate cancer" received by server 26 (FIG. 1).

In addition, providers may configure resources associated with each keyword that the providers have signed up to handle. For example, a provider may edit a list of resources presented to the provider based on association of the provider with a particular keyword or category by activating or deactivating any of the resources in the list. In addition, a provider may add resources for use by the provider, share resource(s) with other providers who have signed up for a particular keyword or category and/or share the resource(s) with users who are not using services of a provider, etc. The system 20 (FIG. 1) may have a default set of resources for a given keyword when a provider signs up for that keyword, however, the provider may configure resource(s) that may automatically be displayed in frames or resource windows to suit the provider's needs. The resource(s) may be selected to automatically send a user's query to each selected resource(s). In addition, a provider may view a list of non-automatic resources, which the provider may select in real-time, for example, by clicking on the resource(s), at which point the query is sent off to the selected resource(s) such that results may be returned to the provider who may then choose to forward information to the user (or Infoseeker™).

When the provider selects a resource from the list of resources 304, the query is passed to the selected resource to conduct the search based on the query in the input field 302a. The interface 300 shown in FIG. 9 includes a web page 308 containing search results for the submitted query and a web page 306 identifying actual results in a contents page when a result displayed in the web page 308 is selected. For example, each instance where the query prostate cancer appears in the Mayoclinic web page is displayed in the web page 308 and a particular instance among results where prostate cancer in web page 308 is displayed in web page 306.

When the provider selects a link from the result(s) contained in the web page 308, web page 306 will pop up without requiring the provider to be directed to a next page of the selected result. The web page 306 may be an embedded browser rendering cascading style sheets, HTML, XHTML, etc., of web pages and components displayed using Java script to provide a full browser function within an application. The web page 308 includes conventional next 308b and previous 308a buttons for navigating through results contained therein and the web page 306 includes conventional next 306b and previous 306a buttons for locating each occurrence of the keyword(s) 74b in web page 306.

Content linked to the search results displayed in the web page 306 accessed by selecting one of the results in web page 308 may be displayed using a specialized built-in HTML renderer that adds an image box 306c surrounding a selected section of a particular web page information in the built-browser that is created to enable the provider to obtain information to be transmitted in response to the request. The image box 306c may overlay any web page, graphics, text, etc., and the information in the image box 306c may be converted to a desired format (e.g., JPEG, etc.) for sending to the provider so that the provider may size the image box 306c to obtain what the provider perceives as relevant in response to the request.

Figure 10:
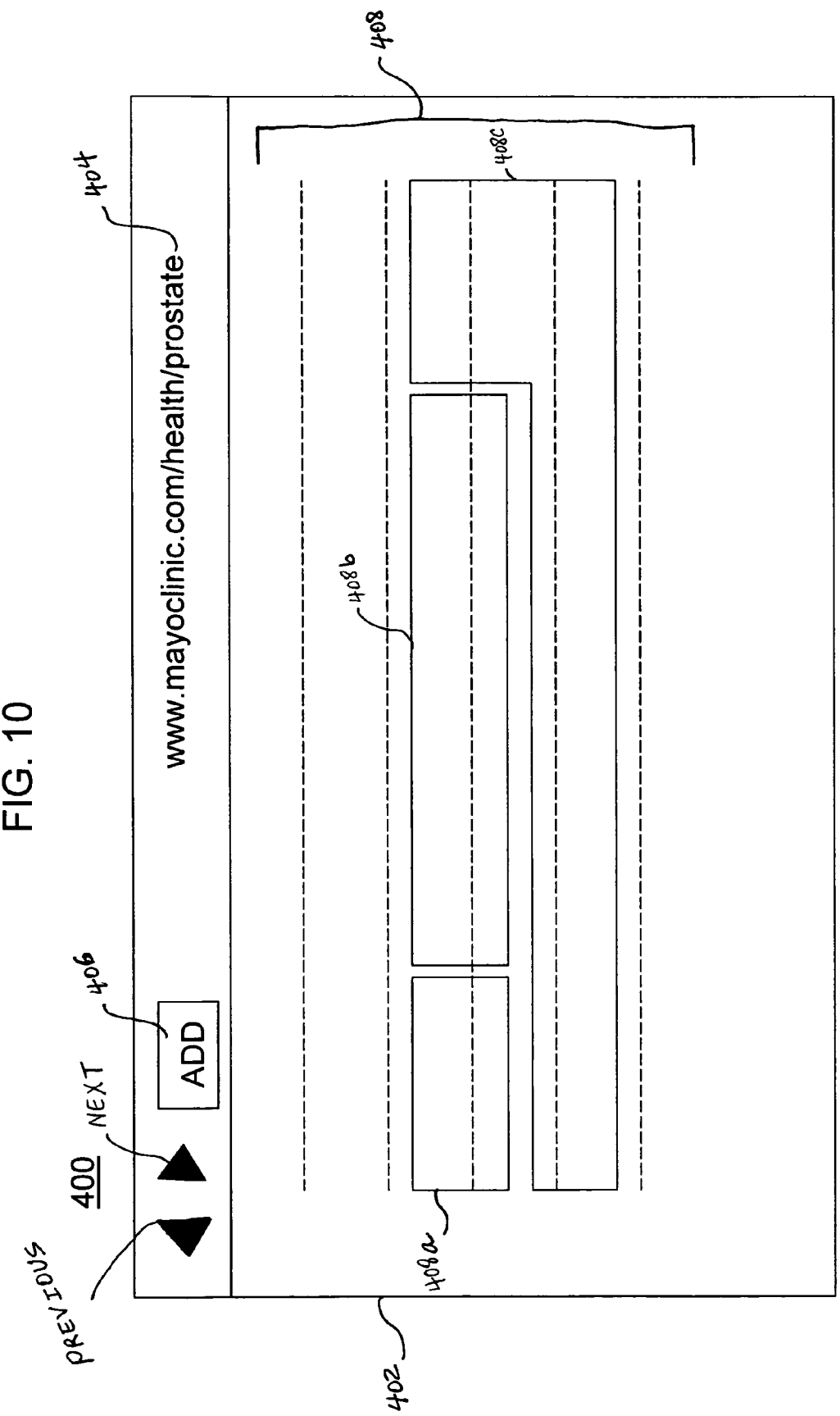
FIG. 10 is an illustration of a graphical user interface (GUI) for extracting an answer pertaining to a request.

FIG. 10 illustrates a GUI 400 for extracting an answer pertaining to a query. As shown in FIG. 10, a window 402 contains results 408 from a resource and a URL 404 indicating the location of the resource. The window 402 displays different portions of the results (denoted 408a, 408b and 408c) 408 from the particular resource with different characteristics (boxed text in this case) and enables the provider to select therefrom to be returned as an answer to a request. The provider may also be presented with pre-selected section(s) of the results 408 (indicated by dashed lines) produced from a search via the resource. For example, the query "prostate cancer" may be highlighted by indicator b and any information surrounding the query may be displayed with a different marker such as indicators a and c.

The provider is able to modify the indicators a, b and c to contain different portions of the results 408 and select the add button 406 to add the selected portion to a response to be presented. When the provider wants a different result, the provider may select previous and next buttons provided in the window 402. As such, the provider is able to capture a precise result and provide the result as a response to a request. For example, the keywords "prostate cancer" contained in a query which is the target string in this case may be identified with 408b bracketed with context before 408a and context after 408c.

Figure 11:
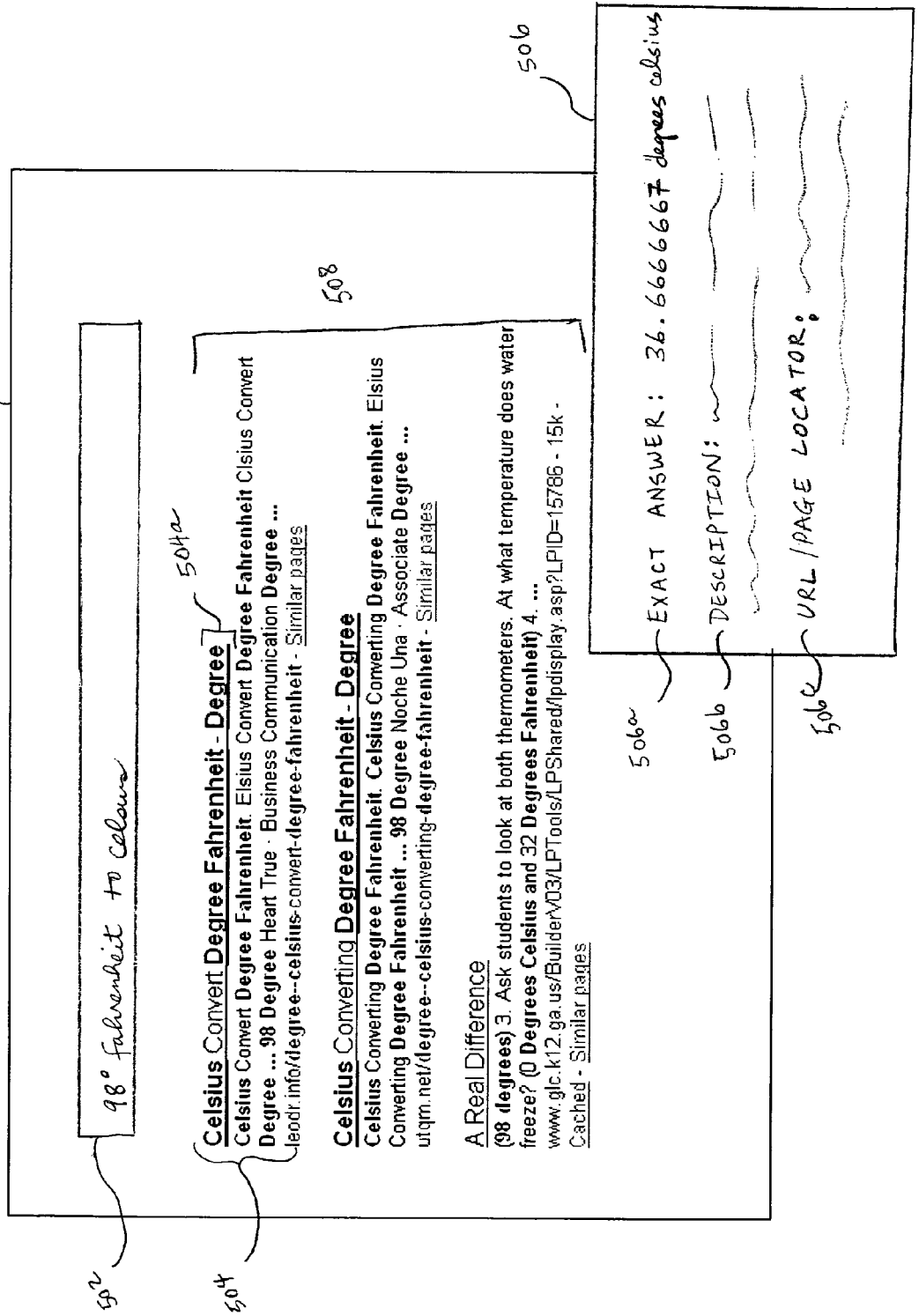
FIG. 11 is an illustration of a GUI for browsing through results from a resource and capturing an exact answer.

FIG. 11 illustrates a GUI 500 for browsing through results from a resource and capturing an exact answer. The GUI 500 includes a window 501 displaying results 508 for a query submitted in a field 502 and a response compiling window 506 for selectively building information to be provided as a response to a request. For example, the results 508 are generated for the query in the field 502 which requests conversion value of 98° Fahrenheit to Celsius in accordance with a search conducted using a resource. The provider is able to analyze the results and select information from the results 508 that the provider thinks qualifies as a response to the request. For example, when the provider analyzes the results 508 and selects a result 504 from a particular resource, the response compiling window 506 is presented to the provider using which the provider builds the response including by modifying contents to be delivered as the response to the request.

As illustrated in FIG. 11, the response compiling window 506 may include exact answer frame 506a for providing a direct or precise answer, description frame 506b for presenting context information related to the answer and URL/page locator frame 506c identifying a location of contents in the response compiling window 506. For example, a direct answer to the query requesting conversion value of 98° Fahrenheit to Celsius may be 36.66 . . . degrees Celsius, the description frame may be the rate of conversion and the URL/Page locator may point to a web page containing a converter.

As illustrated in FIG. 11, a result 504 one of the resources may be selected, for example, by clicking on a link 504a of the resource which allows a provider to access and locate ("drill down") content of the resource where an answer can be calculated perhaps with the provider's entry into a conversion table. Then, when there is content (generated dynamically), the content can be captured and transferred to the user. However, the dynamic web content is copied to a known storage site accessible to the provider (e.g., GoDaddy.com, Yahoo® storage, etc.). In addition to returning a pointer to the copied data, a URL 506c pointing to the resource where the calculation can be performed may also be returned. Even though the answer may be dynamically generated, the answer 506a is presented to the embedded browser as HTML content. The window 501 may be enabled by a provider application that allows the provider to select any content from a web page (even that generated in forms, etc.) as the answer to a query. As explained above with respect to FIG. 10, selecting text from a web page generates the snippet and causes the title of the page and the associated URL to be captured as part of the result. The result line presented will contain the generated result and may direct the user to the web site where the user may use the interface to do other conversions.

An exemplary display 600 illustrating composite results pertaining to a request is illustrated in FIG. 12. As shown in FIG. 12, display 600 includes a window 602 displaying composite results from one or more resources. The window 602 includes results 1 through 3 denoted by 602a through 602c having corresponding context or snippet and URL information. Further, the window 602 may have exact answer frame 604 providing an exact answer to a request. Using the query requesting the conversion from Fahrenheit to Celsius as example, the exact answer frame 604 may be the converted value in Celsius and the results 602a through 602c may be information related to the query and URL pointing to a location of the information. The provider may also prioritize the results in the window 602 based on relevancy, accuracy or other criteria for presenting the results in a manner that enables the requesting user to view the results efficiently.

A method and system disclosed activate resource(s) among available resources for a request, render results from the activated resource(s) in a specialized built-in browser to enable selected information to be obtained from the results and deliver the selected information as a response to the request. The information selected or extracted may include context (snippet) of the extracted information, a URL link referring to a location of the extracted information.

Accordingly, an automated tool for human assisted mining is disclosed to improve experience of an information seeker during a search by providing highly relevant answers based on human assisted determination of relevancy, sorting of information and capturing of results from traditionally returned information.

The many features and advantages of the claimed invention are apparent from the detailed specification and, thus, it is intended by the appended claims to cover all such features and advantages of the claimed invention that fall within the true spirit and scope of the invention. Further, since numerous modifications and changes will readily occur to those skilled in the art, it is not desired to limit the invention to the exact construction and operation illustrated and described for the disclosed embodiments, and accordingly all suitable modifications and equivalents may be resorted to, falling within the scope of the claimed invention. It will further be understood that the phrase "at least one of A, B and C" may be used herein as an alternative expression that means "one or more of A, B and C."

What is claimed is:

1. A computer-implemented method, comprising:
   receiving a query from a user, using a computer, requesting a search on behalf of the user;
   providing available resources including resources previously used to obtain search results in association with a search related to a subject matter of the query received;
   activating selected resources from among said available resources based on a selection from a ranked list of the available resources by a human provider registered for the subject matter of the query;
   submitting the query to each of the activated resources, said activated resources including search engines activated based on content of the query;
   displaying content obtained from each of the activated resources in a corresponding renderer containing web page content from the respective activated resources;
   retrieving a web page indicated by a selected search result indicated by one of the activated resources based on identification of the selected search result by the human provider;
   indicating at least one keyword of the query inside an overlaying box of surrounding text within the web page indicated by the selected search result;
   extracting contents of the overlaying box based on a selection of the human provider from among reviewed contents by the human provider for formulating a direct answer to the query including the web page of the selected search result, said human provider being able to navigate through the content resulting from each of the activated resources and the selected search result and said human provider communicating with the user during said formulating;
   returning said direct answer including context data thereof as a result for the submitted query, where the result includes a link to a web page indicating the selected search result used to produce the direct answer and said extracted contents and the direct answer including a text within a portion obtained from the web page of the selected search result; and
   where said providing of the available resources is based on a highest number of direct answers obtained by human providers responding to queries regarding the subject matter of the query from a web page indicated by a search result of the resources.

2. The computer-implemented method according to claim 1, wherein a location of the direct answer is delivered with the result.

3. The computer-implemented method according to claim 2, wherein the location is a URL of a web page containing the direct answer delivered as the result.

4. The computer-implemented method according to claim 3, further comprising:
   delivering an index page tab for directing the user to the location of the direct answer within the web page.

5. The computer-implemented method according to claim 1, wherein the ranked list of available resources includes a resource submitted by another user.

6. The computer-implemented method according to claim 1, wherein the ranked list of available resources includes a resource defined by a system administrator.

7. The computer-implemented method according to claim 6, wherein said extracting includes modifying the contents of the overlaying box by the human provider.

8. The computer-implemented method according to claim 1, wherein said formulating is executed by another human provider.

9. The computer-implemented method according to claim 1, wherein said displaying content obtained from the activated resources includes simultaneously displaying results of at least two searches.

10. The computer-implemented method according to claim 1, wherein the activated resources are search engines selected by another human search provider and the content of the query.

11. The computer-implemented method according to claim 9, wherein each of the contents obtained from the activated resources are displayed in entirety in a single frame.

12. The computer-implemented method according to claim 1, further comprising:
    providing at least two selection indicators allowing selection of a corresponding search engine to receive the query.

13. The computer-implemented method according to claim 1, further comprising:
    displaying result windows for search results of search engines identified as the activated resources.

14. The computer-implemented method according to claim 1, wherein at least two open windows simultaneously displaying search results are provided.

15. The computer-implemented method according to claim 1, wherein said direct answer includes a WAP message provided to a mobile device associated with the user submitting the query.

* * * * *